United States Patent [19]

Ahmed

[11] 3,757,137

[45] Sept. 4, 1973

[54] LOW VOLTAGE REFERENCE CIRCUIT

[75] Inventor: Adel Abdel Aziz Ahmed, Somerville, N.J.

[73] Assignee: RCA Corporation, New York, N.Y.

[22] Filed: Jan. 21, 1972

[21] Appl. No.: 219,898

Related U.S. Application Data

[63] Continuation of Ser. No. 884,384, Dec. 18, 1969, abandoned.

[52] U.S. Cl. ............. 307/235 R, 307/213, 307/297, 307/315, 307/317, 330/30 D

[51] Int. Cl. ..... H03k 5/20, H03k 17/30, H03f 3/04

[58] Field of Search ................ 307/235 R, 236, 213, 307/297, 315, 317; 328/146, 147, 148, 150, 145; 330/30 D

[56] References Cited

UNITED STATES PATENTS

| | | | |
|---|---|---|---|
| 3,555,300 | 1/1971 | Overlie | 330/30 D X |
| 3,435,257 | 3/1969 | Lawrie, Jr. | 307/289 |
| 3,533,007 | 10/1970 | Segar | 330/30 D |
| 3,530,378 | 9/1970 | Holle et al. | 330/30 D |
| 3,532,909 | 10/1970 | Buckley | 307/213 |
| 3,416,004 | 12/1968 | Taylor | 330/30 D X |
| 3,132,260 | 5/1964 | Gunderson et al. | 307/208 |
| 3,401,351 | 9/1968 | Ellestad | 330/30 D X |
| 3,470,388 | 9/1969 | Scarpa | 328/147 X |
| 3,648,064 | 3/1972 | Mukai et al. | 307/213 |
| 2,861,182 | 11/1958 | Green | 328/145 |

OTHER PUBLICATIONS

Millman & Halkias, Electronic Devices & Circuits, pp. 271, 285–286, 71–72, 127–128, McGraw-Hill Book Co., 1967.

*Primary Examiner*—John W. Huckert
*Assistant Examiner*—L. N. Anagnos
*Attorney*—Edward J. Norton et al., H. Christoffersen and Samuel Cohen

[57] ABSTRACT

The accurately predictable voltage difference between forward biased diodes carrying currents in a known ratio is used to obtain an output signal from a circuit whenever the input signal thereto exceeds an accurately known, set threshold, wherein the supply voltage to the circuit precludes the utilization of Zener diodes.

23 Claims, 1 Drawing Figure

PATENTED SEP 4 1973 3,757,137
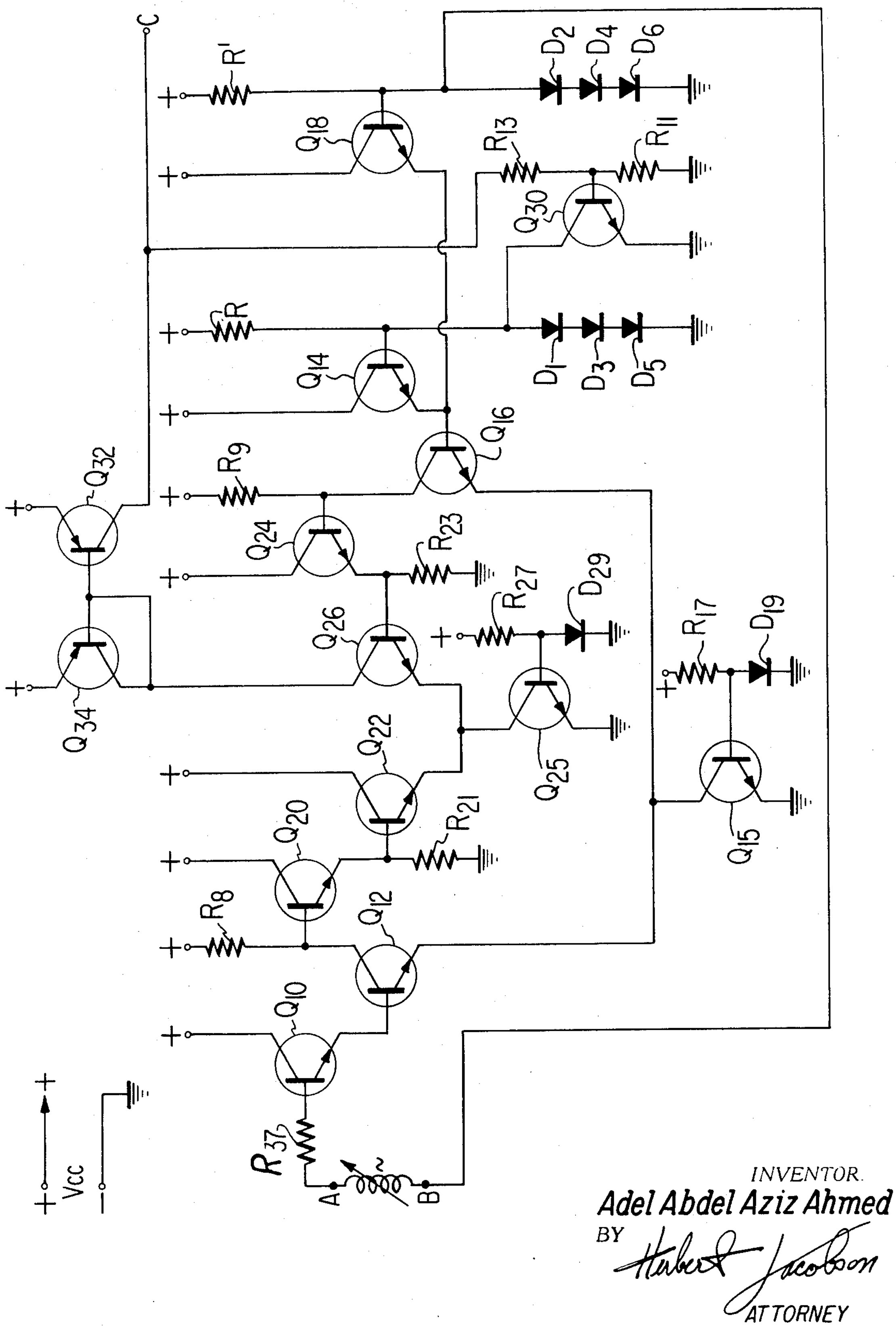
INVENTOR.
Adel Abdel Aziz Ahmed
BY Herbert Jacobson
ATTORNEY

LOW VOLTAGE REFERENCE CIRCUIT

This is a continuation of application Ser. No. 884,384, filed Dec. 18, 1969 now abandoned.

This invention relates to low voltage reference circuits, and, more particularly, to a low voltage detection circuit, capable of being manufactured in integrated form, for use with an electronic ignition system.

Voltage detection circuits wherein an output signal is provided whenever a fluctuating input signal exceeds a predetermined threshold value are well known in the prior art; e.g. Schmitt trigger circuits. These circuits generally rely upon elements such as Zener diodes to provide a voltage level reference. Occasionally, however, the maximum supply voltage available to the circuit is insufficient to permit the use of such elements. For example, it may be desirable to provide a voltage threshold circuit for use within an electronic ignition system, capable of detecting and providing an output signal responsive to an AC input signal whose peak amplitude fluctuates between 70 and 140 millivolts (mv). Such a signal might be derived, for example, from a magnetic pulse distribuor. However, since the supply voltage available is generally derived either from a battery, generator or alternator, and since it may vary considerably (i.e. between 3.5 volts – 18 volts) as a function of engine RPM, operating temperature, battery condition, etc., the continued presence of a supply voltage capable of forward biasing a Zener diode or like element (i.e. in excess of 5 volts) cannot be relied upon.

Accordingly, it is an object of the present invention to provide a low voltage reference circuit.

An additional object of the present invention is to provide a low voltage detection circuit, capable of detecting an input signal in the order of 100 mv, for use within an electronic ignition system.

A further object of the present invention is to provide a low voltage detection circuit capable of being made in integrated form, which will operate from a supply voltage below 4 volts.

In accordance with the present invention, a voltage detection circuit adapted to provide a desired output signal in response to the attainment of a predetermined threshold by a fluctuating input signal comprises a difference circuit having first and second input terminals and an output terminal, said difference circuit adapted to provide said desired output signal when the potential at one of said input terminals attains a predetermined relationship with respect to the potential at the remaining one of said input terminals, a first voltage reference and a second voltage reference, the voltage difference between said first and second voltage references having a predetermined value related to the voltage to be detected, means for coupling said fluctuating input signal in circuit with one of said voltage references and said one input terminal, and means for coupling the other of said voltage references in circuit with said remaining one of said input terminals, said desired signal being provided at the output of said difference circuit when said fluctuating input signal attains said predetermined threshold to cause the potential at said one input terminal to attain said predetermined relationship with respect to the potential at the remaining one of said input terminals.

The present invention, along with additional objects and advantages thereof, will be more fully understood upon reading the specification which follows in light of the accompanying drawing which is representative of a detection circuit in accordance with the present invention.

Although the voltage necessary to forward bias a Zener diode is in the order of 5.6 volts, the required voltage across a forward biased diode (i.e. $V_{be}$) is only in the order of 0.7 volts. Moreover, where a circuit is formed as part of an integrated circuit chip, forward biased diodes are the most practical elements to use for purposes of providing a voltage reference.

In the prior art, the absolute value of the voltage drop across one or more forward biased diodes is commonly used as a voltage reference level. Unfortunately, the $V_{be}$ across a single forward biased diode is subject to a tolerance in the order of ± 35 mv due to process variation. Normally this tolerance is not significant. Where the magnitude of the signal subject to detection is in the order of 100 mv, however, the use of the absolute value of the $V_{be}$ across a forward biased diode becomes impractical.

Although the absolute value of the voltage drop ($V_{be}$) across a forward biased diode may vary by ± 35 mv, $V_{be}$ matching between diodes is very close. That is, for two diodes on the same integrated circuit chip, the $V_{be}$ will be substantially identical, i.e. within ± 2 mv. Moreover, the voltage difference between two matched diodes can be shown to depend upon the current ratio therethrough, and, since the ratio between elements which in turn determine the current ratio can be very accurately controlled, this voltage difference can be accurately predicted in accordance with the following equation;

$$\Delta V = (kT/q)\ 1n\ (I_1/I_2)$$

where:

$K$ = Boltzmann's constant;

$T$ = temperature in degrees Kelvin; and $q$ = the charge on an electron.

Therefore, by controlling the ratio between currents passing through matched forward biased diodes, the voltage difference thereacross can be predicted with sufficient accuracy to permit its use as a source of reference. By providing matched stacks comprising N diodes in series, the voltage difference can be designated within a predetermined range; i.e. $\Delta V = N\ (kT/q)\ 1n\ (I_1/I_2)$.

Turning now to a description of the circuit illustrated in the drawing, transistors $Q_{10}$ and $Q_{12}$ are connected in emitter follower fashion with the emitter of transistor $Q_{10}$ coupled to the base of transistor $Q_{12}$. The emitter of transistor $Q_{12}$ is coupled to the collector of transistor $Q_{15}$ whose emitter is coupled to ground. Resistor $R_{17}$ and diode $D_{19}$ are connected in series, with the base of transistor $Q_{15}$ connected to the junction therebetween; diode $D_{19}$ being connected on its cathode side to ground. It will be seen that transistor $Q_{15}$, resistor $R_{17}$ and diode $D_{19}$ operate as a constant current source. Transistor $Q_{14}$ and $Q_{16}$ are similarly connected with the emitter of transistor $Q_{14}$ coupled to the base of transistor $Q_{16}$ and the emitter of transistor $Q_{16}$ coupled to the collector of transistor $Q_{15}$. Transistor $Q_{16}$ is further coupled via its base to the emitter of transistor $Q_{18}$. Transistors $Q_{10}$, $Q_{12}$, $Q_{14}$, & $Q_{16}$, and $Q_{10}$, $Q_{12}$, $Q_{16}$ & $Q_{18}$ comprise a pair of Darlington-input differential amplifiers with modes of operation mutually exclusive of each other.

Transistors $Q_{20}$ and $Q_{22}$ are connected in emitter follower fashion with the emitter of transistor $Q_{20}$ coupled to the base of transistor $Q_{22}$. The emitter of transistor $Q_{22}$ is coupled to the constant current source comprising transistor $Q_{25}$, resistor $R_{27}$ and diode $D_{29}$. The emitter of transistor $Q_{20}$ is further coupled to ground via resistor $R_{21}$, and its base is coupled to the collector of transistor $Q_{12}$. Transistor $Q_{24}$ and $Q_{26}$ are similarly connected in emitter follower fashion with the emitter of transistor $Q_{24}$ coupled to the base of transistor $Q_{26}$ and the emitter of transistor $Q_{26}$ coupled to the collector of transistor $Q_{25}$. The emitter of transistor $Q_{24}$ is further coupled to ground via resistor $R_{23}$, and its base is coupled to the collector of transistor $Q_{16}$. It will be seen that transistors $Q_{20}$, $Q_{22}$, $Q_{24}$ and $Q_{26}$ comprise a further differential amplifier and that a common output of the differential amplifiers comprising transistors $Q_{10}$, $Q_{12}$, $Q_{14}$, $Q_{16}$ and $Q_{18}$ is applied thereto via the bases of transistors $Q_{20}$, and $Q_{24}$ .

The base of transistor $Q_{10}$ is connected to one (A) of a pair of input terminals via resistor $R_{37}$. The second (B) of said pair of input terminals is connected to the base of transistor $Q_{18}$.

A first diode stack, comprising diodes $D_1$, $D_3$ and $D_5$, is connected between the base of transistor $Q_{14}$ and ground; the diodes being poled to conduct conventionally designated current to ground. A second diode stack, comprising diodes $D_2$, $D_4$ and $D_6$, is connected between the base of transistor $Q_{18}$ and ground in similar fashion. When the circuit is formed on an integrated circuit chip, the $V_{be}$ characteristics of the diode stacks will be inherently matched, as mentioned supra. Should discrete elements be used, they must be selected such that the stacks are matched.

Transistor $Q_{30}$ is coupled in shunting circuit with the first diode stack; the collector thereof being connected to the base of transistor $Q_{14}$; and the emitter thereof being connected to ground. The base of transistor $Q_{30}$ is connected to ground via resistor $R_{11}$ and, in addition, is coupled to the collector of a further transistor $Q_{32}$ via resistor $R_{13}$. The base of transistor $Q_{32}$ is coupled to the collector of transistor $Q_{26}$ which is where the output of the differential amplifier comprising transistors $Q_{20}$, $Q_{22}$, $Q_{24}$, and $Q_{26}$ is taken. Transistor $Q_{34}$ is connected via its collector to the collector of transistor $Q_{26}$ and to the base of transistor $Q_{32}$. The base and collector electrodes of transistor $Q_{34}$ are connected to each other. It may be seen that in this configuration transistor $Q_{34}$ operates substantially as a diode and, in fact, a diode may be substituted therefor with substantially equal effectiveness. However, for purposes of characteristic matching, it has been found beneficial to form all diodes as shown in accordance with the configuration of transistor $Q_{34}$, when made as part of an integrated chip.

The collectors of transistors $Q_{10}$, $Q_{14}$, $Q_{18}$, $Q_{20}$, $Q_{22}$ and $Q_{24}$ are connected to a point of potential $V_{cc}$ which is derived from the supply voltage. Furthermore, the collectors of transistors $Q_{12}$ and $Q_{16}$ are coupled to $V_{cc}$ via resistors $R_8$ and $R_9$ respectively, as shown. In addition, the bases of transistors $Q_{15}$, $Q_{25}$, $Q_{14}$ and $Q_{18}$ are coupled to $V_{cc}$ via resistors $R_{17}$, $R_{27}$, R and R' respectively. Transistors $Q_{32}$ and $Q_{34}$ are connected to $V_{cc}$ via their emitters. All of the transistors are of the NPN type with the exception of transistors $Q_{32}$ and $Q_{34}$ which are PNP.

It will be seen that varying the ratio between R and R' will operate to vary the current flow ratio through the diode stacks. In this fashion the voltage difference across the two stacks of diodes can be accurately designed and predicted. For example, with an R:R' ratio of 1:4, the difference in voltage is 108mv at room temperature, i.e. 25°C., with the diode stack comprising diodes $D_1$, $D_3$ and $D_5$ operating as a "high" voltage reference and the stack comprising diodes $D_2$, $D_4$ and $D_6$ operating as a "low" voltage reference. Accordingly, it will be shown that by appropriately selecting the number of diodes per stack and properly varying the R:R' ratio, the circuit can be designed to detect threshold voltages within a prescribed range. And, while it is difficult to control the absolute values of R and R' when they are formed as part of an integrated circuit, the ratio between them can be quite accurately controlled.

In actual operation the circuit described is designed to operate in an environment wherein the temperature may vary from −40°C to +120°C and the threshold voltage may vary between 70mv and 140mv. For purposes of illustration, however, it will be assumed that an output signal is desired at point C when the input signal applied across terminals A & B exceeds 108mv, i.e. at room temperature and an R:R' ratio of 1:4.

Initially, with an input signal of zero volts applied across terminals A and B, the voltage applied to the base of transistor $Q_{14}$ will be 108mv greater than the voltage applied to the base of transistor $Q_{10}$ due to the voltage difference across the diode stacks. As a result, transistors $Q_{14}$ and $Q_{16}$ are biased into heavy conduction thereby providing the current requirements of the constant current source comprising transistor $Q_{15}$, resistor $R_{17}$ and diode $D_{19}$. Accordingly, transistors $Q_{10}$ and $Q_{12}$ will be non-conducting. With transistor $Q_{12}$ in a non-conducting state, transistors $Q_{20}$ and $Q_{22}$ are biased into heavy conduction via resistor $R_8$ thereby providing the current requirements of the constant current source comprising transistor $Q_{25}$, resistor $R_{27}$ and diode $D_{29}$. Accordingly, transistors $Q_{24}$ and $Q_{26}$ will be non-conducting. With transistor $Q_{26}$ in a non-conducting state, transistor $Q_{34}$ is prevented from conducting and, accordingly, no biasing voltage is applied to the base of transistor $Q_{32}$. In the absence of conduction of transistor $Q_{32}$, transistor $Q_{30}$ is prevented from conducting and no output appears at terminal C.

As the input voltage increases to the point where it approaches the threshold level, i.e. 108mv, the voltage at the base of transistor $Q_{10}$ approaches the voltage at the base of transistor $Q_{14}$ and transistor $Q_{10}$ and $Q_{12}$ begin to conduct thereby providing a portion of the constant current requirements of transistor $Q_{15}$. This in turn causes transistors $Q_{14}$ and $Q_{16}$ to conduct less heavily by an amount equal to the current provided to transistor $Q_{15}$ by transistors $Q_{10}$ and $Q_{12}$. As transistor $Q_{12}$ begins conducting, the biasing voltage at the base of transistor $Q_{20}$ begins to decrease thereby causing transistors $Q_{20}$ and $Q_{22}$ to conduct less heavily. At the same time, transistors $Q_{26}$ and $Q_{24}$ are biased into conduction by the rising potential at the base of transistor $Q_{24}$. Since transistor $Q_{25}$ draws a constant current, the decrease in current from transistors $Q_{20}$ and $Q_{22}$ is picked up by transistors $Q_{24}$ and $Q_{26}$. Furthermore, as transistors $Q_{24}$ and $Q_{26}$ begin to conduct, transistor $Q_{34}$ begins to conduct and in turn, causes transistors $Q_{32}$ and $Q_{30}$ to begin to conduct.

As transistor $Q_{30}$ goes into conduction, the voltage at the anode of diode $D_1$ begins to drop which in turn operates to decrease the high voltage reference. Stated alternately, positive feedback is provided to the high voltage reference, from the output terminal, by transistor $Q_{30}$. In short order, this action, which is regenerative in nature, will cause the circuit to "flip", in Schmitt-trigger fashion, to the condition where transistors $Q_{30}$ and $Q_{32}$ are in heavy conduction and an output signal appears at terminal C.

When the circuit flips, the base of transistor $Q_{14}$ is clamped to ground via transistor 30 which is conducting heavily. The reference voltage, i.e. the voltage appearing at the anode of diode $D_2$, is now applied to the input of the Darlington differential amplifier comprising transistor $Q_{10}$, $Q_{12}$, $Q_{16}$ and $Q_{18}$. It will be seen that even when transistors $Q_{10}$ and and $Q_{12}$ are in heavy conduction, $Q_{16}$ is kept from completely turning off by the biasing potential applied to the base thereof via transistor $Q_{18}$.

When the input signal applied across terminals A and B decreases to zero, the balance condition is approached and the circuit flips back to its initial condition.

Although the described embodiment relies upon the difference in current passing through forward biased diodes as established by resistors in a known ratio, this voltage drop may be provided by other means, for example, the junctions of diodes $D_2$, $D_4$, $D_6$ could be made larger such that the current drawn thereby is sufficient to establish the desired voltage difference between the diode stacks.

What is claimed is:

1. A reference voltage circuit for establishing a potential difference between first and second terminals comprising, in combination:

a first stack of one or more substantially identical semiconductor elements connected in series in the forward direction between said first terminal and a point of reference potential, a second stack comprising a like number of semiconductor elements substantially identical to each other and connected in series in the forward direction between said second terminal and said point of reference potential, each of said semiconductor elements of said first and second stacks having a nonlinear current versus voltage characteristic; and means for applying first and second varying currents to said first and second terminals, which currents remain in a fixed ratio relative to each other independent of variations in their actual magnitude, whereby the elements of said first stack operate at a different point on their characteristic as compared with the elements of said second stack, resulting in a desired potential difference between said terminals.

2. A reference voltage circuit as defined in claim 1 wherein said current applying means comprises a source of supply voltage having a magnitude that varies over a particular range, said currents maintaining said fixed ratio despite variations within said range.

3. A reference voltage circuit as defined in claim 1 wherein said semiconductor elements are diode-connected integrated circuit transistors formed on a common substrate.

4. A reference voltage circuit as defined in claim 3 wherein the potential difference between said first and second terminals is determined in accordance with the following equation:

$$\Delta V = n\ (KT/q)\ 1n\ (I_1/I_2)$$

where $k$ = Boltzmann's constant, $T$ = temperature in degrees Kelvin, $q$ = charge on an electron, $n$ = number of elements per stack, and $I_1$ and $I_2$ = currents through said first and second stacks, respectively.

5. A reference voltage circuit for establishing a potential difference between first and second terminals comprising, in combination:

a first voltage reference comprising a first stack of substantially identical asymmetrically conducting semiconductor elements connected in series in the forward direction between said first terminal and a point of reference potential, each of said semiconductor elements having a nonlinear current versus voltage characteristic;

a second voltage reference comprising a like stack of elements connected in series in the forward direction between said second terminal and said point of reference potential; and means for applying first and second currents of different value to said first and second terminals from a source whose voltage varies over a particular range, said currents maintaining a fixed ratio relative to each other over said range, whereby the elements of said first stack operate at a different point on their characteristic as compared with the elements of said second stack resulting in a desired potential difference between said terminals.

6. A reference voltage circuit as defined in claim 5 wherein said semiconductor elements are diode-connected integrated circuit transistors formed on a common substrate.

7. A reference voltage circuit as defined in claim 5 wherein the potential difference between said first and second terminals is determined in accordance with the following equation:

$$\Delta V = n\ (kT/q)\ 1n\ (I_1/I_2)$$

where $k$ = Boltzmann's constant, $T$ = temperature in degrees Kelvin, $q$ = charge on an electron, $n$ = number of elements per stack, and $I_1$ and $I_2$ = currents through said first and second stacks, respectively.

8. A reference voltage circuit for establishing a relatively small potential difference between first and second terminals comprising, in combination:

a common substrate;

a first plurality of substantially matching diodes formed on said substrate and connected in series in the forward direction between said first terminal and a point of reference potential;

a like plurality of diodes formed on said substrate and connected in series in the forward direction between said second terminal and said point of reference potential; and means for applying first and second varying currents of different value to said first and second terminals, said currents maintaining a fixed ratio with respect to each other independent of variations in their actual magnitude, said ratio determining the potential difference between said first and second terminals.

9. A reference voltage circuit as defined in claim 8 wherein said current applying means comprises a source whose voltage varies over a particular range, said currents maintaining said fixed ratio over said range.

10. A reference voltage circuit as defined in claim 9 wherein the potential difference between said first and second terminals is determined in accordance with the following equation:

$$\Delta V = n\ (kT/q)\ \ln\ (I_1/I_2)$$

where $k$ = Boltzmann's constant, $T$ = temperature in degrees Kelvin, $q$ = charge on an electron, $n$ = number of elements per stack, and $I_1$ and $I_2$ = currents through said first and second stacks, respectively.

11. A voltage detection circuit adapted to provide a desired output signal in response to the attainment of a predetermined threshold by a fluctuating input signal, comprising:

a difference circuit having first and second input terminals and an output terminal, said difference circuit being adapted to provide said desired output signal when the potential at one of said input terminals attains a predetermined relationship with respect to the potential at the remaining one of said input terminals;

a first voltage reference comprising a first stack of one or more substantially identical semiconductor elements formed as part of an integrated circuit and connected in series in the forward direction;

a second voltage reference comprising a second stack of one or more substantially identical semiconductor elements formed as part of an integrated circuit and connected in series in the forward direction;

means for applying first and second varying currents to said first and second reference stacks, which currents remain in a fixed ratio relative to each other independent of variations in their actual magnitude, said fixed ratio establishing a voltage difference between said first and second voltage references, said difference having a predeterminable value related to the voltage to be detected;

means for coupling said fluctuating input signal in circuit with one of said voltage references and said one input terminal; and means for coupling the other of said voltage references in circuit with said remaining one of said input terminals, whereby said desired signal is provided at the output of said difference circuit when said fluctuating input signal attains said predetermined threshold to cause the potential at said one input terminal to attain said predetermined relationship with respect to the potential at said remaining one of said input terminals.

12. A voltage detection circuit as defined in claim 11 wherein said current applying means comprises a source of supply voltage having a magnitude that varies over a particular range, said currents maintaining said fixed ratio despite variations within said range.

13. A voltage detection circuit as defined in claim 11 wherein said first and second stacks comprise a like number of substantially identical diode-connected integrated circuit transistors formed on a common substrate.

14. A voltage detection circuit as defined in claim 13 wherein the voltage difference between said first and second voltage references is determined in accordance with the following equation:

$$\Delta V = n\ (kT/q)\ \ln\ (I_1/I_2)$$

where $k$ = Boltzmann's constant, $T$ = temperature in degrees Kelvin, $q$ = charge on an electron, $n$ = number of elements per stack, and $I_1$ and $I_2$ = currents through said first and second stacks, respectively.

15. A voltage detection circuit as defined in claim 11 wherein the reference level of said other of said voltage references varies in response to the condition at said output terminal of said difference circuit.

16. A voltage detection circuit adapted to provide a desired output signal in response to the attainment of a predetermined threshold by a fluctuating input signal having a relatively low magnitude of potential, comprising:

a difference circuit having first and second input terminals and an output terminal;

a first voltage reference comprising a first stack of one or more substantially identical asymmetrically conducting semiconductor elements formed on a common substrate and connected in series in the forward direction, each of said elements having a nonlinear current versus voltage characteristic;

a second voltage reference comprising a like stack of elements similarly formed and connected;

means for applying first and second varying currents of different value to said first and second reference stacks, which currents remain in a fixed ratio relative to each other idependent of variations in their actual magnitude, whereby the elements of said first stack operate at a different point on their characteristic as compared with the elements of said second stack resulting in a voltage difference between said first and second stacks equal to the voltage to be detected, said difference being small relative to the absolute voltage across either of said stacks;

means for coupling said fluctuating input signal in circuit with one of said voltage references and one of said input terminals; and means for coupling the other of said voltage references in circuit with the other of said input terminals, whereby said desired signal is provided at the output of said difference circuit when said fluctuating input signal attains said predetermined threshold to cause the potential at said one input terminal to attain said predetermined relationship with respect to the potential at said other terminal.

17. A voltage detection circuit as defined in claim 16 wherein all of said semiconductor elements are diode-connected integrated circuit transistors formed on a common substrate.

18. A voltage detection circuit as defined in claim 17 wherein the voltage difference between said first and second voltage references is determined in accordance with the following equation:

$$\Delta V = n\ (kT/q)\ \ln\ (I_1/I_2)$$

where $k$ = Boltzmann's constant, $T$ = temperature in degrees Kelvin, $q$ = charge on an electron, $n$ = number of diodes per stack, and $I_1$ and $I_2$ = currents through said first and second stacks, respectively.

19. A voltage detection circuit as defined in claim 16 further comprising, feedback means coupled between said output terminal of said difference circuit and said other voltage reference, said feedback means operating in response to the condition at said output terminal to cause the reference level of said other voltage reference to decrease as the signal at said output terminal approaches said desired output signal.

20. A threshold detection circuit adapted to provide a desired output signal in response to the attainment of a predetermined threshold by a fluctuating input signal of relatively small magnitude comprising, in combination:

a source of supply voltage having a magnitude that varies over a particular range;

a difference circuit having first and second input terminals and an output terminal, said difference circuit being adapted to provide said output signal when the potential at one of said input terminals attains a predetermined relationship with respect to the potential at the remaining one of said input terminals;

a first voltage reference comprising a first stack of one or more substantially identical diode-connected integrated circuit transistors connected in series in the forward direction, and a second voltage reference comprising a like stack of transistors similarly connected, all of said transistors formed on a common substrate;

means for applying first and second currents of different value to said first and second reference stacks from said source of supply voltage, said currents maintaining a fixed ratio relative to each other over said range, said ratio establishing a voltage difference between said first and second voltage reference stacks equal to the voltage to be detected, said difference being small relative to the absolute voltage across either of said stacks;

means for coupling said fluctuating input signal in circuit with one of said voltage references and said one input terminal; and means for coupling the other of said voltage references in circuit with said remaining one of said input terminals, whereby said desired output signal is provided at the output of said difference circuit when said fluctuating input signal attains said predetermined threshold to cause the potential at said one input terminal to attain said predetermined relationship with respect to the potential at said remaining input terminal.

21. A threshold detection circuit as defined in claim 20 wherein said current applying means further comprises first and second resistances formed on said common substrate and connected in series with the first and second stacks of said first and second voltage references, respectively, the resistive ratio of said resistances determining said fixed current ratio.

22. A threshold detection circuit as defined in claim 21 wherein the voltage difference between said first and second voltage references is determined in accordance with the following equation:

$$\Delta V = n\,(kT/q)\,\ln\,(I_1/I_2)$$

where $k$ = Boltzmann's constant $T$ = temperature in degrees Kelvin, $q$ = charge on an electron, $n$ = number of diodes per stack, and $I_1$ and $I_2$ = currents through said first and second stacks, respectively.

23. A threshold detection circuit as defined in claim 21 further comprising feedback means coupled between said output terminal of said difference circuit and said other voltage reference, said feedback means operating in response to the condition at said output terminal to cause the voltage across said other voltage reference to decrease as the signal at said output terminal approaches said desired output signal.

* * * * *